(12) United States Patent
Feng et al.

(10) Patent No.: US 11,795,992 B1
(45) Date of Patent: Oct. 24, 2023

(54) MULTIPLE COMPARTMENT CARABINER

(71) Applicant: Touching Design LLC, Katy, TX (US)

(72) Inventors: Haoyu Feng, Katy, TX (US); Dan Xiong, Katy, TX (US); Jinyao Feng, Katy, TX (US)

(73) Assignee: Touching Design LLC, Katy, TX (US)

( * ) Notice: Subject to any disclaimer, the term of this patent is extended or adjusted under 35 U.S.C. 154(b) by 3 days.

(21) Appl. No.: 18/186,112

(22) Filed: Mar. 17, 2023

Related U.S. Application Data

(63) Continuation-in-part of application No. 29/870,775, filed on Feb. 3, 2023.

(30) Foreign Application Priority Data

Feb. 8, 2023 (CN) .......................... 202320265656.0

(51) Int. Cl.
*F16B 45/02* (2006.01)
(52) U.S. Cl.
CPC ................................ *F16B 45/023* (2021.05)
(58) Field of Classification Search
CPC ..................................................... F16B 45/023
See application file for complete search history.

(56) References Cited

U.S. PATENT DOCUMENTS

| | | | |
|---|---|---|---|
| 7,540,140 B1 | 6/2009 | Diaz et al. | |
| 7,614,209 B1 | 11/2009 | Payne et al. | |
| D626,393 S * | 11/2010 | Ormsbee | D8/18 |
| D652,971 S * | 1/2012 | Ormsbee | D26/38 |
| 8,172,476 B2 | 5/2012 | Berney | |
| D669,764 S * | 10/2012 | Kelleghan | D8/356 |
| D686,058 S | 7/2013 | Paik et al. | |
| D698,626 S * | 2/2014 | Ormsbee | D8/367 |
| D704,594 S | 5/2014 | Cherin et al. | |
| 9,003,617 B2 | 4/2015 | Walker et al. | |
| 9,255,602 B2 * | 2/2016 | Liang | F16B 45/02 |
| D753,988 S * | 4/2016 | Jiang | D8/370 |
| D767,975 S * | 10/2016 | Jiang | D8/356 |
| D772,029 S * | 11/2016 | Spater | D8/18 |
| D775,513 S * | 1/2017 | Kelleghan | D8/356 |
| D784,798 S | 4/2017 | Logsdon et al. | |
| 9,903,511 B2 | 2/2018 | Vermillion | |
| D833,853 S * | 11/2018 | Berman | D8/356 |
| D861,327 S | 10/2019 | Osmanski et al. | |
| D863,101 S | 10/2019 | Chang | |

(Continued)

OTHER PUBLICATIONS

Bass Pro Shops—Nite Ize G-Series Dual Chamber Carabiner—Available from Internet <URL: https://www.basspro.com/shop/en/nite-ize-n-series-dual-chamber-carabiner>.

*Primary Examiner* — David M Upchurch
(74) *Attorney, Agent, or Firm* — Gallium Law; Wesley Schwie, Esq.; Justin Schwechter

(57) ABSTRACT

The present disclosure includes an apparatus, comprising a body. In some examples, the apparatus includes a gate rotatably coupled to the body, the gate including an arm, a middle portion, and a bend. According to some examples, the gate is configured to rest in an initial position. The gate may be configured to move from the initial position in response to a first force. In some examples, the arm moves a greater distance than the middle portion when the gate is moved from the initial position. According to some examples, a torque occurs in the bend when the gate is moved from the initial position.

20 Claims, 9 Drawing Sheets

(56) References Cited

U.S. PATENT DOCUMENTS

| | | |
|---|---|---|
| D876,934 S | 3/2020 | Adelman |
| D931,085 S | 9/2021 | Paik et al. |
| D953,147 S | 5/2022 | Wildes |
| D954,538 S | 6/2022 | Grossman |
| D954,539 S | 6/2022 | Grossman |
| D954,540 S | 6/2022 | Grossman |
| D954,541 S | 6/2022 | Grossman |
| 11,629,749 B2 * | 4/2023 | Adelman .............. F16B 45/023 24/376 |
| 2012/0201599 A1 | 8/2012 | Reppen |
| 2016/0255918 A1 * | 9/2016 | Grossman ............... F16B 45/02 |
| 2022/0018384 A1 | 1/2022 | Adelman |

* cited by examiner

MULTIPLE COMPARTMENT CARABINER

BACKGROUND

Carabiners are used in a variety of applications, generally to keep multiple objects contained in one location, similar to a key ring, but permitting larger items. For example, someone partaking in rock climbing may use a carabiner to secure a rope to a harness that they are wearing for protection during an ascent or descent, while the quick access of a gate permits the rock climber to easily move the rope when needed. However, traditional carabiners have deficiencies that the present disclosure seeks to remedy as described further within.

SUMMARY

The present disclosure includes an apparatus (e.g., the apparatus as shown in FIG. 1), including a body (e.g., the body 102 as shown in FIG. 1). In some examples, the apparatus includes a gate (e.g., the gate 108 as shown in FIG. 1) rotatably coupled to the body, the gate including an arm (e.g., one of the arms 210 as shown in FIG. 2), a middle portion (e.g., the middle portion 502 as shown in FIG. 5), and a bend (e.g., one of the bends 504 as shown in FIG. 5). According to some examples, the gate is configured to rest in an initial position (e.g., the initial position 200 as shown in FIG. 2). The gate may be configured to move from the initial position in response to a first force (e.g., the first force 602 as shown in FIG. 6). In some examples, the arm moves a greater distance than the middle portion when the gate is moved from the initial position. According to some examples, a torque (e.g., one of the torques 702 as shown in FIG. 7B) occurs in the bend when the gate is moved from the initial position.

The present disclosure also includes an apparatus, including a body. In some examples, the apparatus includes a gate including a first arm (e.g., the first arm 210a as shown in FIG. 2), a second arm (e.g., the second arm 210b as shown in FIG. 2), a middle portion, a first bend (e.g., the first bend 504a as shown in FIG. 5) between the first arm and the middle portion, and a second bend (e.g., the second bend 504b as shown in FIG. 5) between the second arm and the middle portion. The gate may be rotatably coupled to the body. In some examples, the gate is configured to rest in an initial position. According to some examples, the gate is configured to move from the initial position in response to a first force. The first arm and the second arm may move a greater distance than the middle portion when the gate is moved from the initial position. In some examples, a first torque (e.g., the first torque 702a as shown in FIG. 7B) occurs in the first bend and a second torque (e.g., the second torque 702b as shown in FIG. 7B) occurs in the second bend when the gate is moved from the initial position.

The present disclosure also includes an apparatus, including a body including a first attachment point (e.g., the first attachment point 410a as shown in FIG. 4B) and a second attachment point (e.g., the second attachment point 410b as shown in FIG. 4B). In some examples, the apparatus includes a gate including a first arm, a second arm, a middle portion, a first bend between the first arm and the middle portion, and a second bend between the second arm and the middle portion. The first arm may be configured to rotatably couple to the first attachment point. In some examples, the second arm is configured to rotatably couple to the second attachment point. According to some examples, the gate is configured to rest in an initial position. The gate may be configured to move from the initial position in response to a first force. In some examples, the first arm and the second arm move a greater distance than the middle portion when the gate is moved from the initial position. According to some examples, a first torque occurs in the first bend and a second torque occurs in the second bend when the gate is moved from the initial position.

The foregoing, and other features and advantages of the invention, will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

10—Apparatus
102—Body
104—Opening
106—Spine
108—Gate
110—Nose
200—Initial position
202—Confinement area
202a—First confinement area
202b—Second confinement area
204—Crotch
204a—First crotch
204b—Second crotch
206—Elbow
208—Latch
210—Arm
210a—First arm
210b—Second arm
300—Open position
302—First opening
304—Second opening
402—Major axis
404—Minor axis
406—Offset axis 408—Point
410—Attachment point
410a—First attachment point
410b—Second attachment point
412—At least one screw
502—Middle portion
504—Bend
504a—First bend
504b—Second bend
506—C-shaped profile
602—First force
604—Second force
606—Third force
702—Torque
702a—First torque
702b—Second torque
704—Potential energy
706—Spring force

DETAILED DESCRIPTION

Many carabiners in the prior art only include one region of containment, which generally means there are also only two points of contact between the gate and a body of the carabiner—the hinge point about which the gate rotates, and an end of the gate that engages with the body, either through a latch or friction. Because these carabiners only have one point of contact outside of the rotatable hinge point, this means there is only one point of safety preventing the contents from exiting the carabiner. This single region of containment also limits the ways in which the carabiner may be used.

Additionally, carabiners that are rotated from parallel to perpendicular orientations, or are loaded from off-axis orientations, may suffer from cross-loading. This cross-loading may create off-axis tensile forces, which could cause premature failure of the carabiner, which is a safety concern.

The present disclosure seeks to remedy the deficiencies in the prior art with single contact points, single containment regions, and cross-loading scenarios, while still providing for a cost-efficient system.

Figure 1:
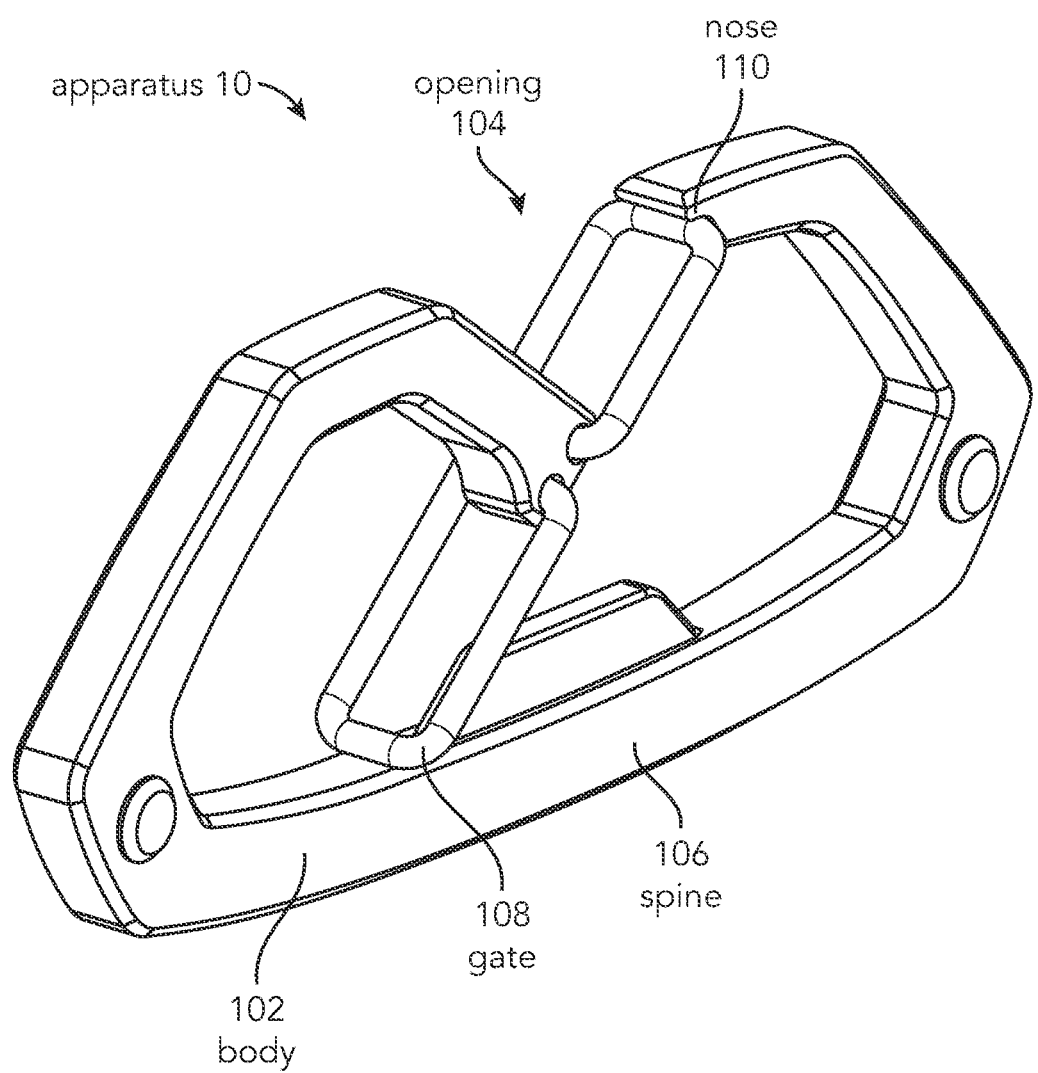
FIG. 1 illustrates a perspective view of the apparatus, according to an example of the present disclosure.

FIG. 1 illustrates a perspective view of the apparatus 10. As can be seen in FIG. 1, the apparatus 10 may include a body 102 including a nose 110 at one end, and a spine 106 along a length of the body 102. The apparatus 10 may also include a first opening 302 formed as a gap between the nose 110 and a portion of the body 102 opposite the nose 110. A gate 108 may be present to secure this first opening 302 and prevent items from gaining access to a confinement area of the apparatus 10, and/or prevent items from exiting the confinement area of the apparatus 10. Said confinement area may be divided into separate confinement areas, as described in further detail in FIGS. 2A and 2B below. In some examples, the apparatus 10 defines a body of a carabiner, and as such may be used for permitting a rope into and out of the confinement area, which is useful in many activities, such as rock climbing.

Figure 2A:
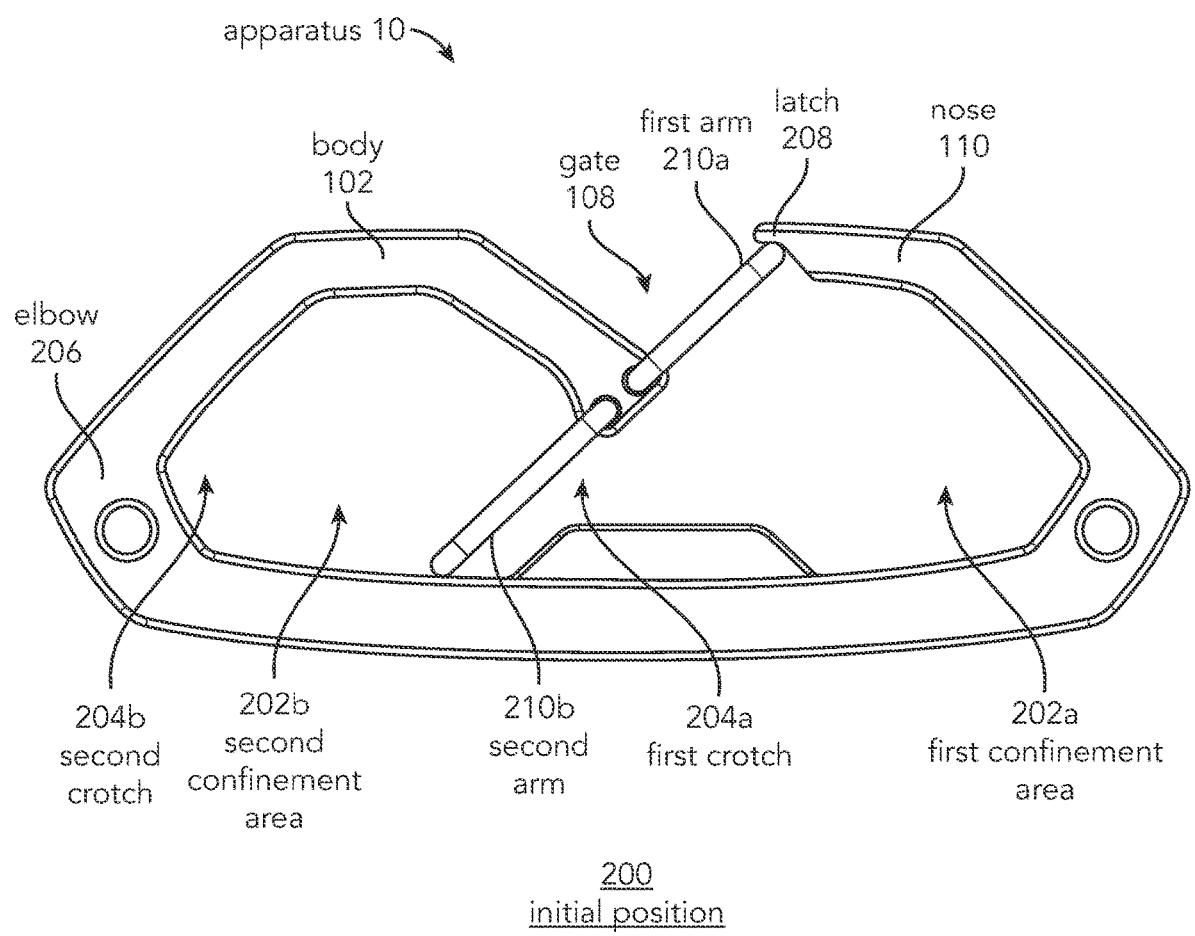
FIG. 2A illustrates a front view of the apparatus of FIG. 1 in an initial position, according to some examples.
Figure 2B:
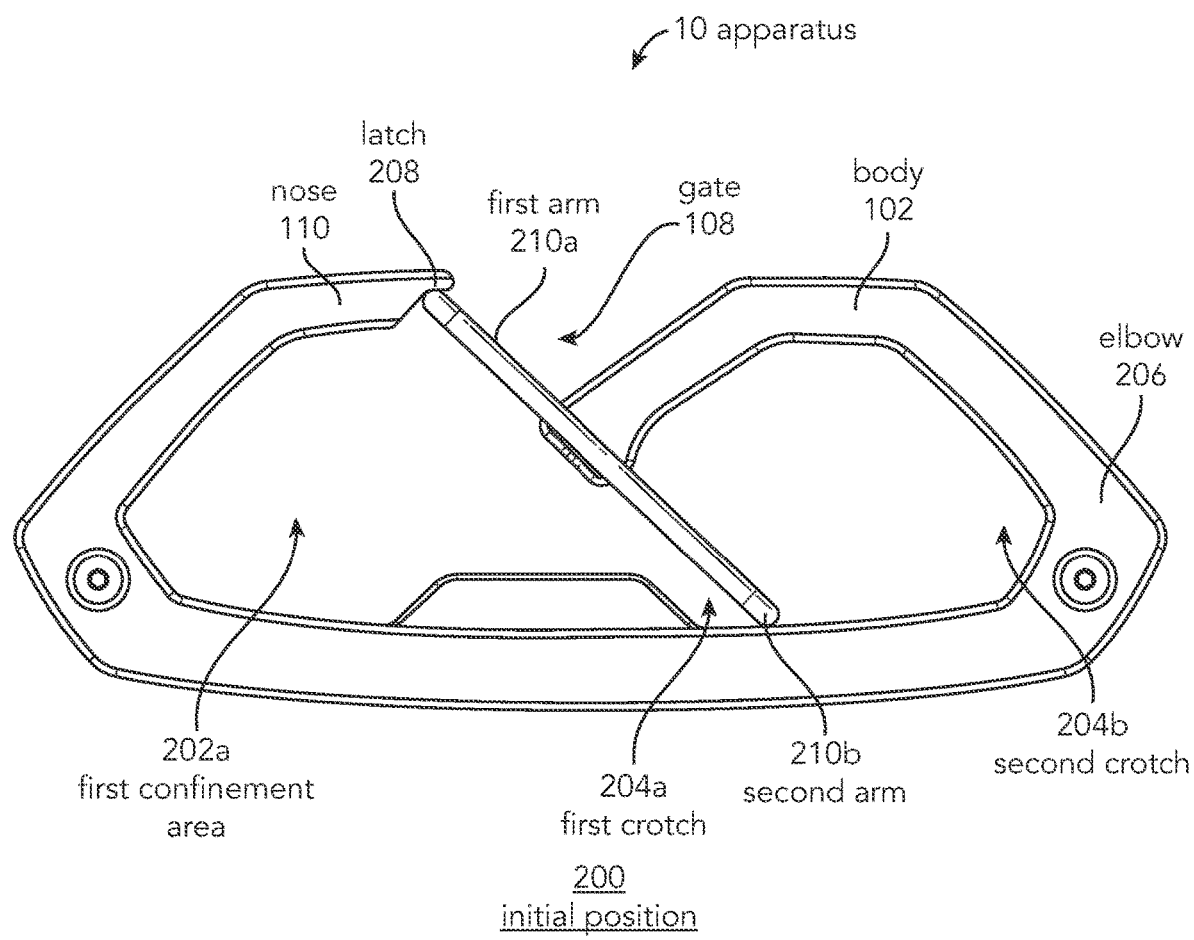
FIG. 2B illustrates a back view of the apparatus of FIG. 2A.

FIG. 2A illustrates a front view of the apparatus 10 of FIG. 1 as it might appear in an initial position 200, and FIG. 2B illustrates a back view of the same. As can be seen in FIGS. 2A and 2B, the gate 108 may include a first arm 210a and a second arm 210b. While in this initial position 200, the gate 108 may span across the body 102 in a diagonal fashion, which may permit the gate 108 to make contact with the body 102 at the spine 106, perhaps at an end of the second arm 210b. The gate 108 may additionally, or in isolation, make contact with the nose 110, perhaps at an end of the first arm 210a. The nose 110 may include a latch 208, which permits a greater point of mechanical contact between the first arm 210a and the body 102.

In this initial position 200, the gate 108 may divide the confinement area within the body 102 into multiple confinement areas 202. This may be as few as one confinement area 202, through the use of a single arm, and up to as many confinement areas 202 as can be reasonably fit within the apparatus 10 through the use of an equivalent number of arms in the gate. For the purposes of discussion here, the gate 108 includes a first arm 210a and a second arm 210b, and therefore divides the confinement area 202 into two distinct confinement areas 202—a first confinement area 202a, and a second confinement area 202b. As shown in FIGS. 2A and 2B, the first confinement area 202a may include the space between the gate 108 and a front half of the body 102. The second confinement, likewise, may include the space between the gate 108 (or specifically the second arm 210b) and a back half of the body 102. These multiple confinement areas 202 permit a user the ability to separate objects on the apparatus 10. Additionally, the second confinement area 202b permits a user to achieve greater security of an object, as said object must pass through multiple confinement areas 202 prior to exiting the apparatus 10.

Once an object enters a confinement area 202, it may rest upon a crotch 204. In some examples, this crotch 204 is the area that the object naturally rests upon while the apparatus 10 is in use. The body 102 may include an elbow 206, and in prior art inventions, the crotch may be found within the confinement area of the apparatus at this elbow, the confinement area being made from the body and the gate.

In the present disclosure, two crotches 204 are present, due to the two confinement areas 202. This indicates that as many crotches 204 may be present as the quantity of confinement areas 202 that are present. As shown in FIGS. 2A and 2B, a first crotch 204a may be present at the location of contact between the second arm 210b and the spine 106. An object that has entered the first confinement area 202a but has not been permitted into the second confinement area 202b may rest upon this first crotch while the apparatus 10 is in the initial position 200.

A second crotch 204b, as shown in FIGS. 2A and 2B, may also be present. This second crotch 204b, similar to a traditional carabiner, may be present at the interior portion of the elbow 206. An object that has passed through the first confinement area 202a and entered the second confinement area 202b may rest upon this second crotch while the apparatus 10 is in this initial position 200.

Figure 3A:
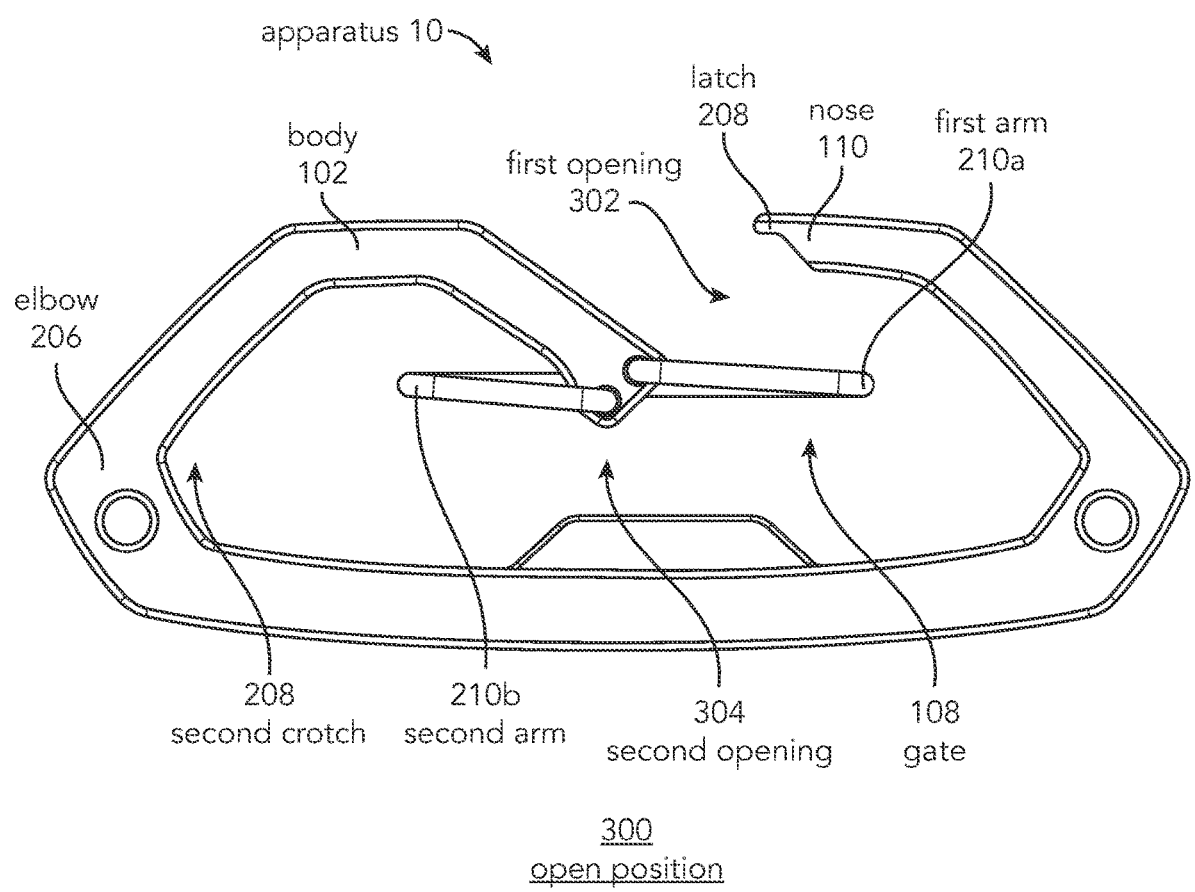
FIG. 3A illustrates a front view of the apparatus of FIG. 1 in an open position, according to some examples.
Figure 3B:
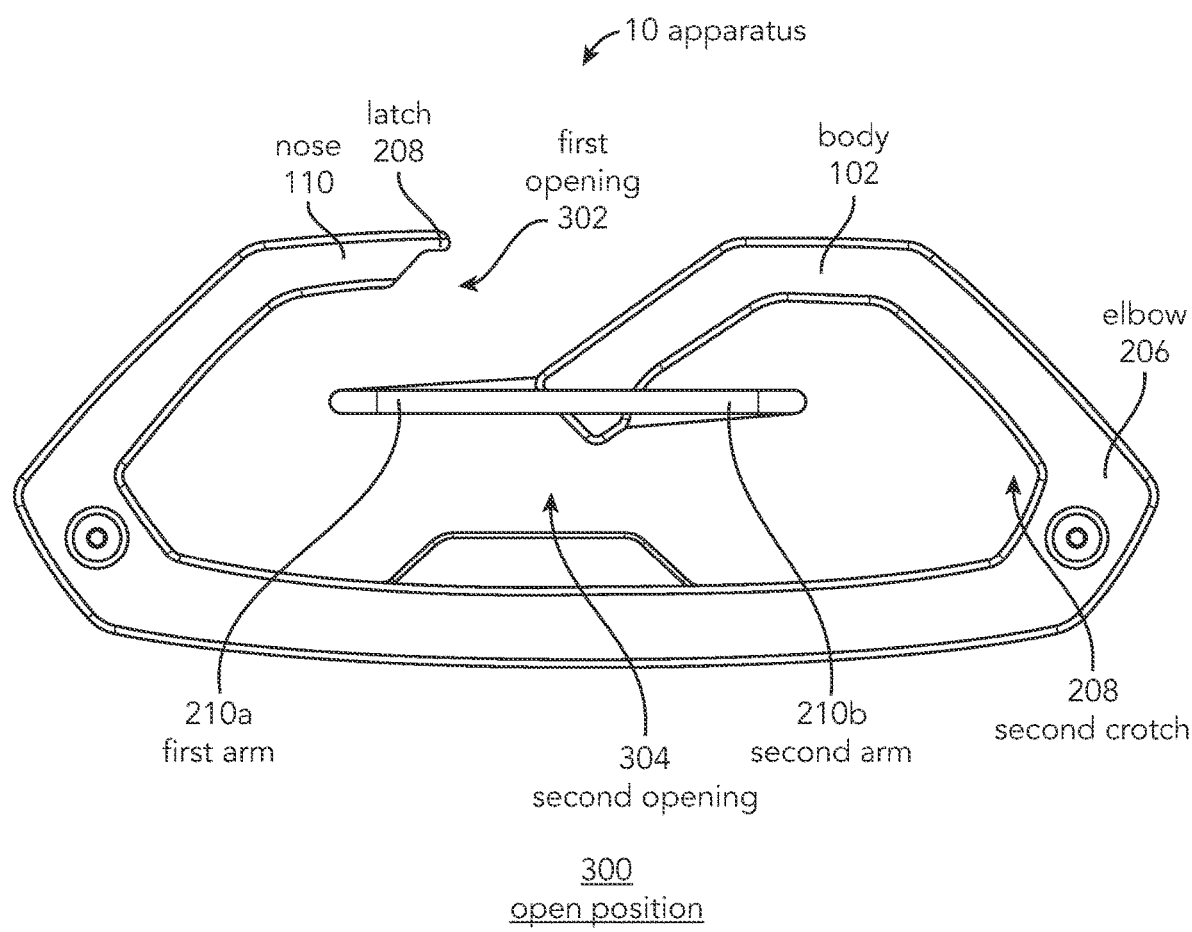
FIG. 3B illustrates a back view of the apparatus of FIG. 3A.

FIG. 3A illustrates a front view of the apparatus 10 of FIG. 1 as it might appear in an open position 300, and FIG. 3B illustrates a back view of the same. In this open position 300, the path with which an object may enter the first confinement area 202a and the second confinement area 202b may be seen.

When the gate 108 is moved from the initial position 200 to the open position 300, or somewhere therebetween, an object may pass through a first opening 302 between the nose 110 and the first arm 210a, allowing access to the first confinement area 202a. At this point, the gate 108 may be permitted to close, allowing the object to temporarily reside in this first confinement area 202a.

If the gate 108 remains open (or, if an object is already within the first confinement area 202a and the gate 108 is then opened) the object may pass through a second opening 304 between the gate 108 and the spine 106 of the body 102, allowing access to the second confinement area 202b. The gate 108 may then return to the initial position 200, allowing the object residence in this second confinement area. This process may be repeated for the quantity of confinement areas 202 present in the apparatus 10.

In order to remove an object from inside of the second confinement area 202b, the inverse of the above paragraphs must occur. Because the second arm 210b makes contact with the spine 106 in the initial position 200, there is no way for the second arm 210b to move past this initial position 200 in a way opposite the open position 300. This means that, in order for an object in the second confinement area 202b to be removed, the gate 108 must be moved from the initial position 200 to the open position 300, or somewhere therebetween. The object can then be moved back through the second opening 304 into the first confinement area 202a.

Once the object is in the first confinement area 202a, the gate may be permitted to return to the initial position 200, or the object can be moved through the first opening 302 in order to egress the apparatus 10 entirely. Should the object be permitted to stay in the first confinement area 202a for a period of time, the gate 108 may be moved to permit the object to move through the first opening 302 at any time.

Figure 4A:
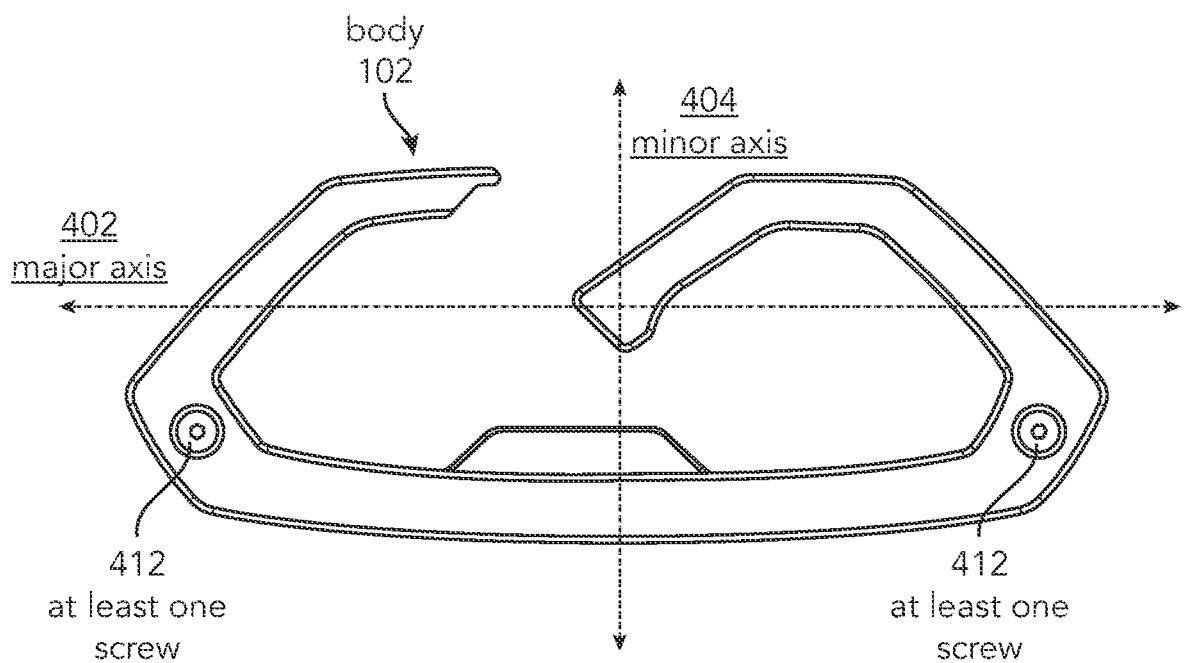
FIG. 4A illustrates a back view of a body of an apparatus, according to some examples.
Figure 4B:
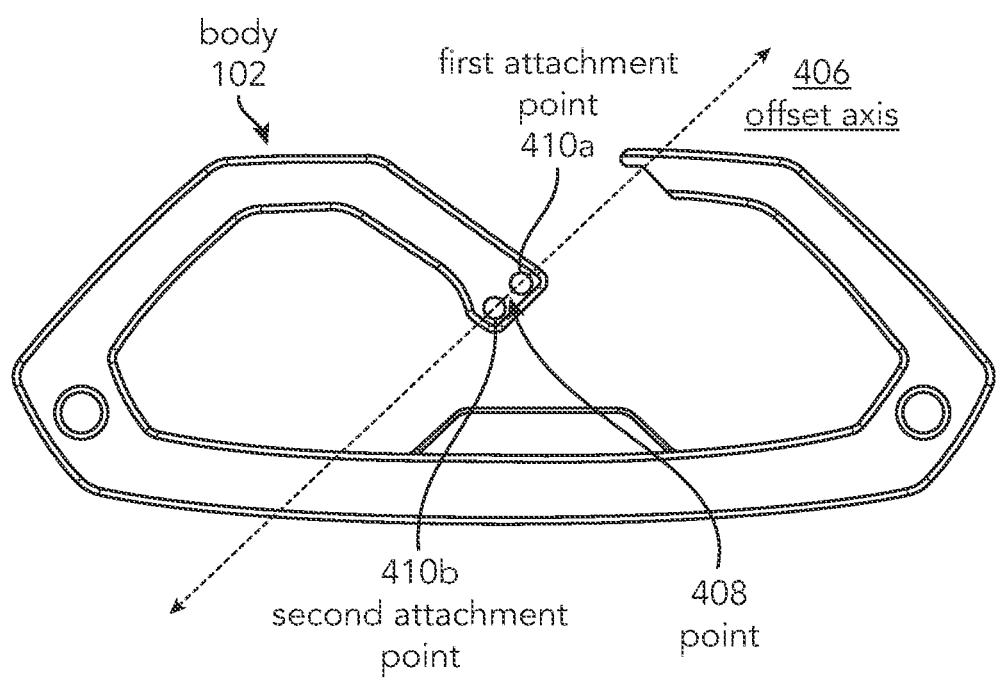
FIG. 4B illustrates a front view of the body of FIG. 4A.

FIG. 4A illustrates a back view of a body 102 of an apparatus 10 without a gate 108 present, and FIG. 4B shows a front view of the same. Specifically, FIG. 4A illustrates a major axis 402 running lengthwise across the body 102, as well as a minor axis 404 running substantially perpendicular to the major axis 402, approximately vertically about the body 102. The major axis 402 may be substantially parallel to the spine 106 of the body 102, though this is not necessary, and as depicted the spine 106 may have a slight curve or other shape.

When the gate 108 is in a fully open position 300, the first arm 210a and the second arm 210b may be substantially parallel to the major axis 402. As will be discussed in FIG. 7B, the middle portion will not run substantially parallel to the major axis 402 in this open position 300.

Also depicted in FIG. 4A is at least one screw 412 in the elbow 206, as well as at least one screw 412 in a portion of the body 102 opposite the elbow 206. It is understood that at least one screw 412 may be present in either, both, or neither of these positions, as well as any other position along the body 102 where a screw 412 may fit and be desired. The at least one screw 412 may permit a user to remove said at least one screw 412 for attachment of another item, such as a key ring.

As seen in FIG. 4B, somewhere between the major axis 402 and the minor axis 404 lays an offset axis 406. This offset axis 406 may be achieved at any desired angle between the major axis 402 and the minor axis 404. As illustrated in FIG. 4B, though while not strictly necessary, multiple attachment points 410 may be present on the body 102 and lay along the offset axis 406. While two attachment points are shown, as few one attachment point 410, and up to as many attachment points 410 as desired may be present on the body 102. If more than two attachment points 410 are included on the body 102, it is not strictly necessary that they lay along a single offset axis 406.

Included in FIG. 4B is a first attachment point 410a, and a second attachment point 410b. As shown, the first attachment point 410a may lay above the major axis 402 and to the right of the minor axis 404 (when viewed from the front). In opposition, the second attachment point 410b may lay below the major axis 402 and to the left of the minor axis 404 (when viewed from the front). These orientations may be mirrored or flipped as desired.

The first arm 210a may attach to the first attachment point 410a, and the second arm 210b may attach to the second attachment point 410b. In either case, the arm 210 may couple to the attachment point 410 via a friction fit, permitting mechanical coupling between said arm 210 and attachment point 410 while also permitting rotation. This facilitates the securement of the arms 210 to the attachment point 410 while preventing unwanted decoupling during rotation of the gate 108.

Also shown in FIG. 4B is a point 408 that lays between the first attachment point 410a and the second attachment point 410b along the offset axis 406. This point 408 is a center point among all included axes (major axis 402, minor axis 404, and offset axis 406), and is the point 408 about which that gate 108 could be said to rotate when moving from an initial position 200 to an open position 300. If additional attachment points 410 are included in an apparatus 10, the point 408 would remain substantially in the geometric center of all included attachment points 410.

Figure 5:
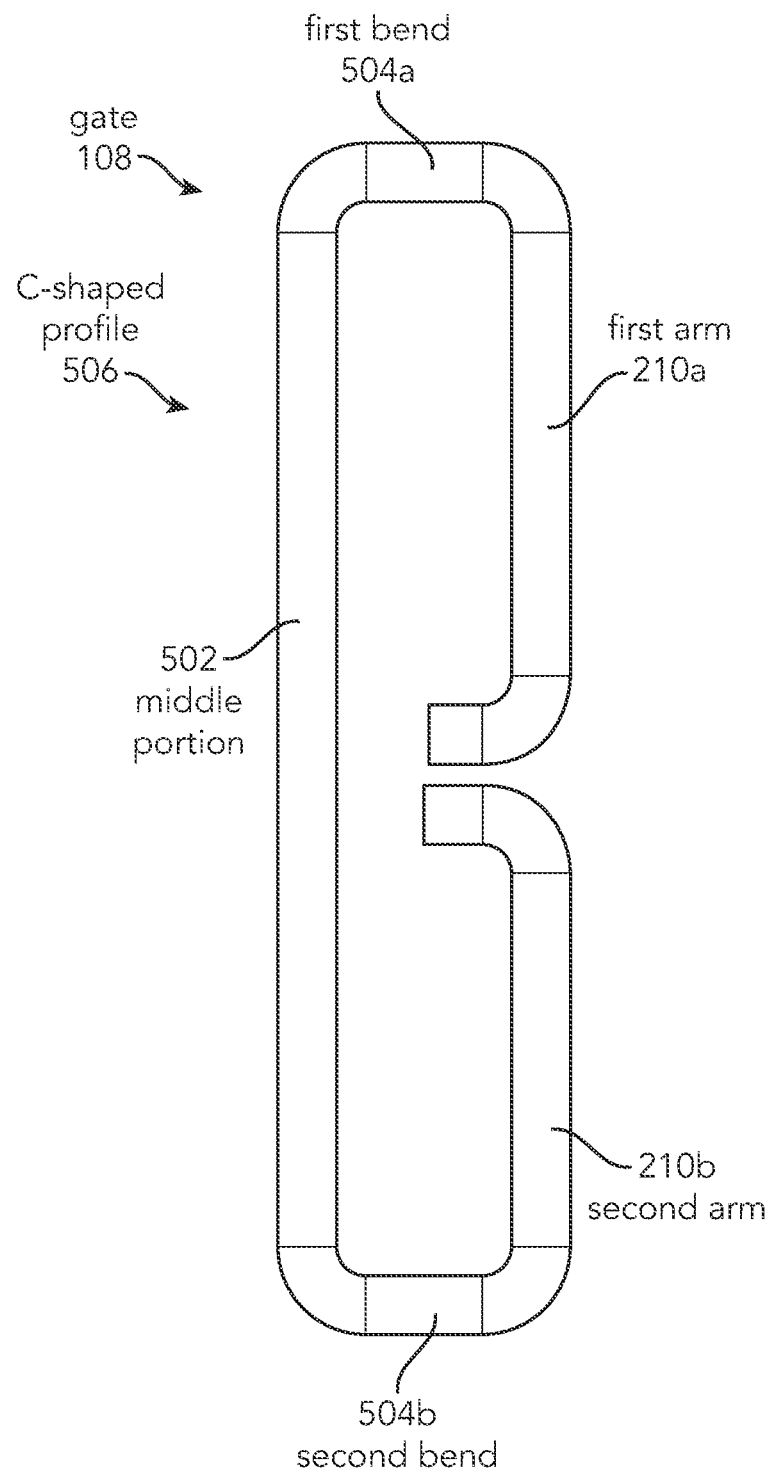
FIG. 5 illustrates a top view of a gate of an apparatus, according to some examples.

FIG. 5 illustrates a potential top view of a gate 108 of an apparatus 10. As can be seen in FIG. 5, this gate 108 may display a C-shaped profile 506. The gate 108 may include a middle portion 502 opposite the first arm 210a and the second arm 210b. In some examples, the middle portion 502 is coupled to the first arm 210a via a first bend 504a. Likewise, the middle portion 502 may be coupled to the second arm 210b via a second bend 504b. The number of included bends 504 depend on the number of included arms 210 in the apparatus. These bends 504 permit the formation of potential energy via torque, as will be discussed further in FIGS. 6, 7A, and 7B.

Figure 6:
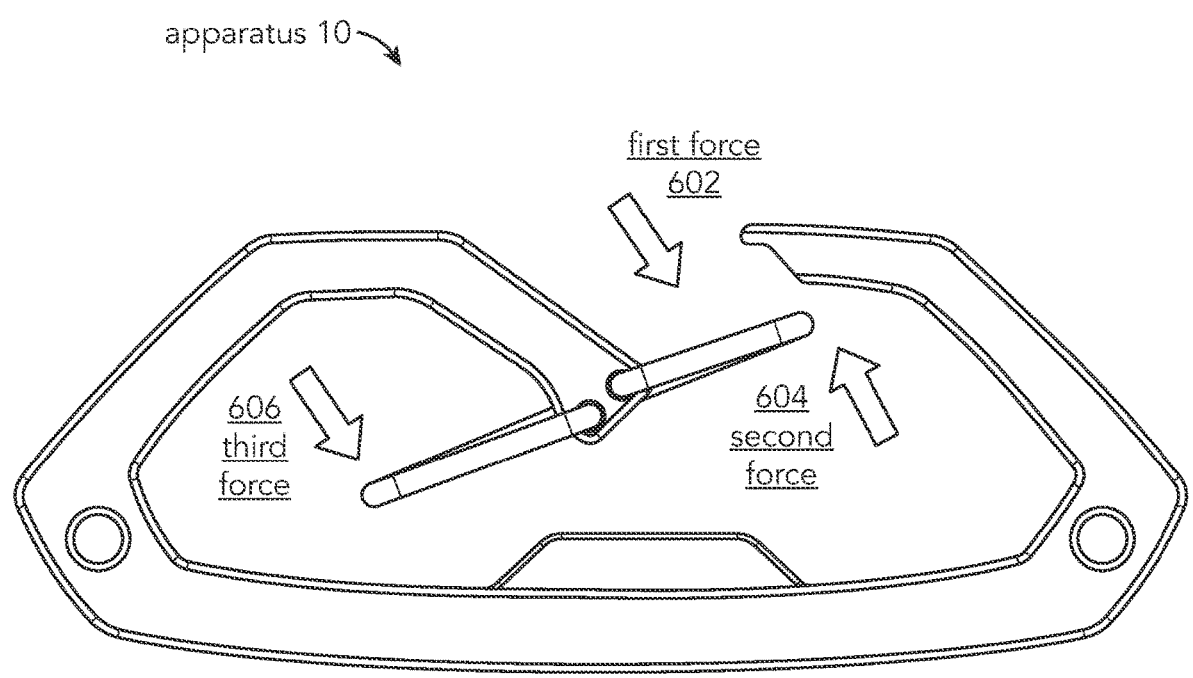
FIG. 6 illustrates a front view of the apparatus of FIG. 1 showing an applied force, according to some examples.

FIG. 6 illustrates a front view of an example apparatus 10 showing an applied force, as well as the forces that may operate to return the gate 108 to its initial position. As seen in FIG. 6, a first force 602 may be applied to the first arm 210a in order to move the gate 108 from the initial position 200 to the open position 300, or somewhere therebetween. In response to the application of the first force 602, bends 504 in the gate produce torque (as discussed below in FIG. 7B), and this torque acts to return, or attempt to return, the gate 108 to the initial position 200. A first torque enacts a second force 604 on the first arm contra to the first force 602. Similarly, in the case of a second arm, as shown in FIG. 6, a third force 606 may act on the second arm 210b in a rotationally symmetric fashion to the second force 604. The combination of forces of the second force 604 and the third force 606 act to return the gate 108 to the initial position 200 once the gate has been moved any distance from said initial position 200.

While the first force 602 is only shown acting on the first arm 210a, it is understood that the first force 602, or some additional force may be enacted on the second arm 210b opposite the third force 606 in order to move the gate 108 from the initial position 200 to the open position 300 or any position therebetween. Additionally, while only a second force 604 and a third force 606 are illustrated in FIG. 6, it is understood that additional forces may be present based on the number of arms 210 included in the apparatus 10.

Figure 7A:
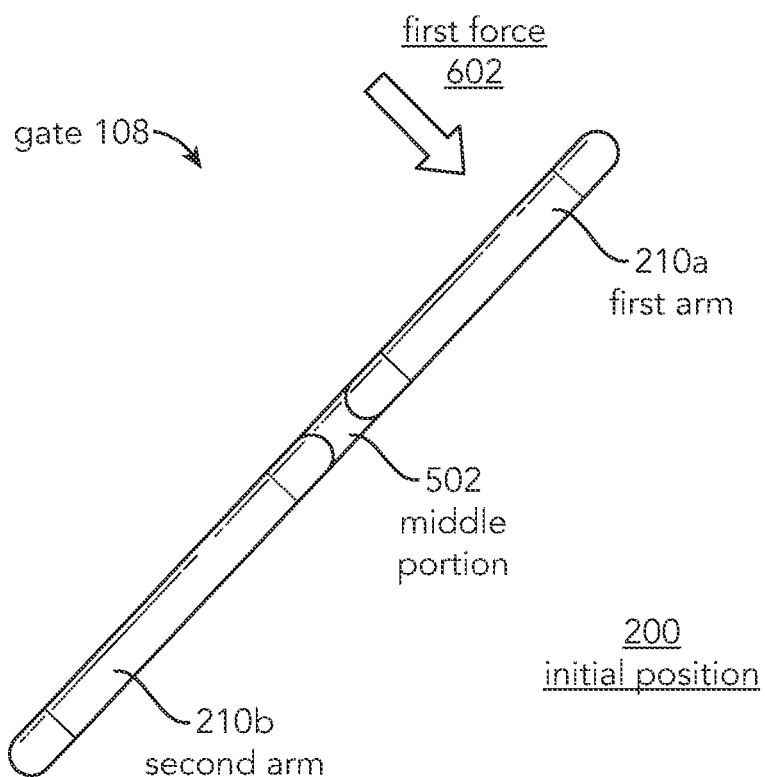
FIG. 7A illustrates a front view of a gate of an apparatus prior to a force being applied, according to some examples.
Figure 7B:
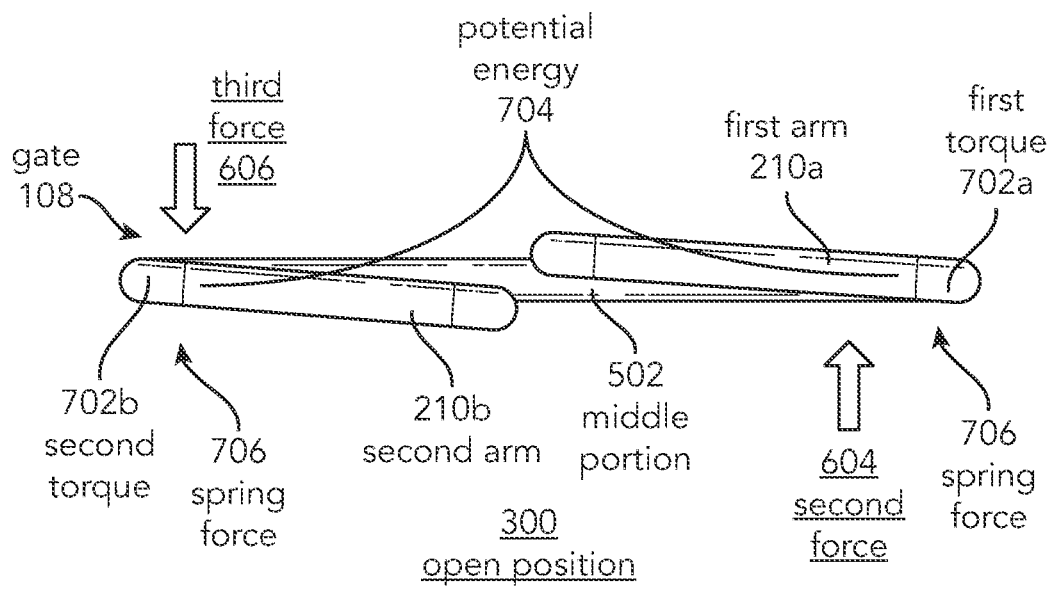
FIG. 7B illustrates a front view of a gate of an apparatus after a force has been applied, according to some examples.

FIG. 7A illustrates a front view of a gate 108 of an apparatus 10 prior to a force being applied, and FIG. 7B illustrates a front view of the gate 108 of FIG. 7A after the force has been applied, according to some examples. Specifically, FIG. 7A illustrates where the first force 602 may be applied to the first arm 210a.

FIG. 7B illustrates how the appearance of the gate 108 may appear when in the open position 300. As shown, the middle portion 502 is not parallel to the first arm 210a and the second arm 210b. This is because the first arm 210a and second arm 210b are offset from the center point 408. This offset attachment causes the first arm 210a to lay above the major axis 402 when in the open position 300, and the second arm 210b to lay below the major axis 402 when in the open position 300. Because the middle portion 502 connects the first arm 210a and the second arm 210b, it cannot also be parallel to both of these arms 210, and therefore cannot be parallel to the major axis 402 as described above in FIGS. 4A and 4B.

As also seen in FIG. 7B from this orientation, the second force 604 is acting "upward" against the first arm 210a in a direction opposite the first force 602 from FIG. 7A. This second force 604 is a result of the first bend 504a (not labeled here but shown in FIG. 5) bending, thus creating a first torque 702a. This first torque 702a creates potential energy 704 in the form of a spring force 706 in the first bend 504a, which both resists the first force 602, and attempts to return the gate 108 to the initial position 200.

Similarly, a third force 606 is shown acting "downward" on the second arm 210b. This third force 606 acts rotationally symmetrical to the second force 604, assisting with both the resistance of the first force 602 and the return of the gate 108 to the initial position 200. This third force 606 is a result of the second bend 504b (also not labeled here by shown in FIG. 5) bending, thus creating a second torque 702b. This second torque 702b likewise creates potential energy 704 in the form of a spring force 706 in the second bend 504b.

The present disclosure includes an apparatus 10, including a body 102. In some examples, the apparatus 10 includes a gate 108 rotatably coupled to the body 102, the gate 108 including an arm 210, a middle portion 502, and a bend 504. According to some examples, the gate 108 is configured to rest in an initial position 200. The gate 108 may be configured to move from the initial position 200 in response to a first force 602. In some examples, the arm 210 moves a greater distance than the middle portion 502 when the gate 108 is moved from the initial position 200. According to some examples, a torque 702 occurs in the bend 504 when the gate 108 is moved from the initial position 200.

The torque 702 may create a potential energy 704 that returns the gate 108 to the initial position 200 in response to the removal of the first force 602 on the gate 108. In some examples, the torque 702 includes a second force 604 generated to return the gate 108 to the initial position 200. According to some examples, the body 102 is similar to a body of a carabiner. The gate 108 may include a C-shaped profile 506. In some examples, the gate 108 is rotatably coupled to the body 102 via friction.

According to some examples, the body 102 includes a nose 110. The bend 504 may be configured to abut the nose 110 when the gate 108 is in the initial position 200. In some examples, the nose 110 includes a latch 208. According to some examples, the bend 504 is configured to abut the latch 208 when the gate 108 is in the initial position 200.

The body 102 may include a spine 106. In some examples, the bend 504 is configured to abut the spine 106 when the gate 108 is in the initial position 200. According to some examples, the body 102 includes an elbow 206. The apparatus 10 may include a confinement area 202. In some examples, the confinement area 202 includes an area between the elbow 206, the spine 106, and the gate 108 when the gate 108 is in the initial position 200. According to some examples, an opening 104 is created when the gate 108 is moved from the initial position 200. The confinement area 202 may be accessible via the opening 104. In some examples, the elbow 206 includes a crotch 204. According to some examples, the apparatus 10 includes a screw 412 removably coupled to the elbow 206.

The body 102 may include a major axis 402. In some examples, the gate 108 is parallel to the major axis 402 when the gate 108 is moved from the initial position 200. According to some examples, the body 102 includes a minor axis 404 perpendicular to the major axis 402. The body 102 may include an offset axis 406 that lays between the major axis 402 and the minor axis 404. In some examples, the body 102 includes a point 408 and an attachment point 410 that is adjacent to the point 408. According to some examples, the gate 108 is rotatably coupled to the body 102 at the attachment point 410. The point 408 and the attachment point 410 may lay on the offset axis 406. In some examples, the gate 108 lays on the offset axis 406 when the gate 108 is in the initial position 200.

According to some examples, the gate 108 is heat treated. A spring force 706 of the gate 108 may be increased via the gate 108 being heat treated.

The present disclosure also includes an apparatus 10, including a body 102. In some examples, the apparatus 10 includes a gate 108 including a first arm 210a, a second arm 210b, a middle portion 502, a first bend 504a between the first arm 210a and the middle portion 502, and a second bend 504b between the second arm 210b and the middle portion 502. The gate 108 may be rotatably coupled to the body 102. In some examples, the gate 108 is configured to rest in an initial position 200. According to some examples, the gate 108 is configured to move from the initial position 200 in response to a first force 602. The first arm 210a and the second arm 210b may move a greater distance than the middle portion 502 when the gate 108 is moved from the initial position 200. In some examples, a first torque 702a occurs in the first bend 504a and a second torque 702b occurs in the second bend 504b when the gate 108 is moved from the initial position 200.

According to some examples, the first torque 702a and the second torque 702b create a potential energy 704 that returns the gate 108 to the initial position 200 in response to removal of the first force 602 on the gate 108. The first torque 702a may includes a second force 604. In some examples, the second torque 702b includes a third force 606. According to some examples, the second force 604 and the third force 606 are configured to return the gate 108 to the initial position 200. The body 102 may be similar to a body of a carabiner. In some examples, the gate 108 includes a C-shaped profile 506. According to some examples, the gate 108 is rotatably coupled to the body 102 via friction.

The body 102 may include a nose 110. In some examples, a bend (the first bend 504a or the second bend 504b) is configured to abut the nose 110 when the gate 108 is in the initial position 200. According to some examples, the body 102 includes a spine 106. The first bend 504a may be configured to abut the nose 110 and the second bend 504b is configured to abut the spine 106 when the gate 108 is in the initial position 200.

In some examples, the nose 110 includes a latch 208. According to some examples, the bend (the first bend 504a or the second bend 504b) is configured to abut the latch 208 when the gate 108 is in the initial position 200.

The body 102 may include a spine 106. In some examples, the first bend 504a is configured to abut the latch 208. According to some examples, the second bend 504b is configured to abut the spine 106 when the gate 108 is in the initial position 200. The apparatus 10 may include a first crotch 204a at a location where the second bend 504b makes contact with the spine 106. In some examples, the apparatus 10 includes a first confinement area 202a including an area between the first crotch 204a, the spine 106, and the gate 108 when the gate 108 is in the initial position 200.

According to some examples, the body 102 includes an elbow 206. The elbow 206 may include a second crotch 204b. In some examples, the apparatus 10 includes a first confinement area 202a, the first confinement area 202a including an area between the first crotch 204a, the spine 106, and the gate 108 when the gate 108 is in the initial position 200. According to some examples, the apparatus 10 includes a second confinement area 202b including an area between the second crotch 204b, the spine 106, and the gate 108 when the gate 108 is in the initial position 200.

The apparatus 10 may include a first opening 302 between the first arm 210a and the body 102 when the gate 108 is moved from the initial position 200. In some examples, the first confinement area 202a is accessible via the first opening 302. According to some examples, the apparatus 10 includes a second opening 304 between the second arm 210b and the body 102 when the gate 108 is moved from the initial position 200. The second confinement area 202b may be accessible via the second opening 304. In some examples, an object must pass through the first confinement area 202a prior to entering the second confinement area 202b. According to some examples, the apparatus 10 includes a screw 412 removably coupled to the elbow 206.

The body 102 may include a major axis 402. In some examples, the gate 108 is parallel to the major axis 402 when the gate 108 is moved from the initial position 200. According to some examples, the body 102 includes a minor axis 404 perpendicular to the major axis 402.

The body 102 may include a point 408. In some examples, the body 102 includes a first attachment point 410a that is adjacent to the point 408, and the first attachment point 410a lays on a first side of the major axis 402 and on a first side of the minor axis 404. According to some examples, the body 102 includes a second attachment point 410b that is adjacent to the point 408, and the second attachment point 410b lays on a second side of the major axis 402 opposite the first side of the major axis 402, and on a second side of the minor axis 404 opposite the first side of the minor axis 404. The first arm 210a may be rotatably coupled to the body 102 at the first attachment point 410a. In some examples, the second arm 210b is rotatably coupled to the body 102 at the second attachment point 410b.

According to some examples, the body 102 includes an offset axis 406 that lays between the major axis 402 and the minor axis 404. The point 408, the first attachment point 410a, and the second attachment point 410b may lay on the offset axis 406. In some examples, the gate 108 lays on the offset axis 406 when the gate 108 is in the initial position 200.

According to some examples, the gate 108 is heat treated. A spring force 706 of the gate 108 may be increased via the gate 108 being heat treated.

The present disclosure also includes an apparatus 10, including a body 102 including a first attachment point 410a and a second attachment point 410b. In some examples, the apparatus 10 includes a gate 108 including a first arm 210a, a second arm 210b, a middle portion 502, a first bend 504a between the first arm 210a and the middle portion 502, and a second bend 504b between the second arm 210b and the middle portion 502. The first arm 210a may be configured to rotatably couple to the first attachment point 410a. In some examples, the second arm 210b is configured to rotatably couple to the second attachment point 410b. According to some examples, the gate 108 is configured to rest in an initial position 200. The gate 108 may be configured to move from the initial position 200 in response to a first force 602. In some examples, the first arm 210a and the second arm 210b move a greater distance than the middle portion 502 when the gate 108 is moved from the initial position 200. According to some examples, a first torque 702a occurs in the first bend 504a and a second torque 702b occurs in the second bend 504b when the gate 108 is moved from the initial position 200.

The first torque 702a and the second torque 702b may create a potential energy 704 that returns the gate 108 to the initial position 200 in response to removal of the first force 602 on the gate 108. In some examples, the first torque 702a includes a second force 604. According to some examples, the second torque 702b includes a third force 606. The second force 604 and the third force 606 may be configured to return the gate 108 to the initial position 200. In some examples, the body 102 is similar to a body of a carabiner. According to some examples, the gate 108 includes a C-shaped profile 506. The first arm 210a may be rotatably coupled to the first attachment point 410a via friction. In some examples, the second arm 210b is rotatably coupled to the second attachment point 410b via friction.

According to some examples, the body 102 includes a nose 110. A bend (the first bend 504a or the second bend 504b) may be configured to abut the nose 110 when the gate 108 is in the initial position 200. In some examples, the body 102 includes a spine 106. The first bend 504a is configured to abut the nose 110 and the second bend 504b is configured to abut the spine 106 when the gate 108 is in the initial position 200.

According to some examples, the nose 110 includes a latch 208. A bend (the first bend 504a or the second bend 504b) may be configured to abut the latch 208 when the gate 108 is in the initial position 200. In some examples, the body 102 includes a spine 106. According to some examples, the first bend 504a is configured to abut the latch 208 and the second bend 504b is configured to abut the spine 106 when the gate 108 is in the initial position 200. The apparatus 10 may include a first crotch 204a at a location where the second bend 504b makes contact with the spine 106. In some examples, the apparatus 10 includes a first confinement area 202a including an area between the first crotch 204a, the spine 106, and the gate 108 when the gate 108 is in the initial position 200.

According to some examples, the body 102 includes an elbow 206. The elbow 206 may include a second crotch 204b. In some examples, the apparatus 10 includes a first confinement area 202a, the first confinement area 202a including an area between the first crotch 204a, the spine 106, and the gate 108 when the gate 108 is in the initial position 200. According to some examples, the apparatus 10 includes a second confinement area 202b including an area between the second crotch 204b, the spine 106, and the gate 108 when the gate 108 is in the initial position 200.

The apparatus 10 may include a first opening 302 between the first arm 210a and the body 102 when the gate 108 is moved from the initial position 200. In some examples, the first confinement area 202a is accessible via the first opening 302. According to some examples, the apparatus 10 includes a second opening 304 between the second arm 210b and the body 102 when the gate 108 is moved from the initial position 200. The second confinement area 202b may be accessible via the second opening 304.

In some examples, an object must pass through the first confinement area 202a prior to entering the second confinement area 202b. According to some examples, the apparatus 10 includes a screw 412 removably coupled to the elbow 206.

The body 102 may include a major axis 402. In some examples, the gate 108 is parallel to the major axis 402 when the gate 108 is moved from the initial position 200. According to some examples, the body 102 includes a minor axis 404 perpendicular to the major axis 402. The first attachment point 410a may lay on a first side of the major axis 402 and on a first side of the minor axis 404. In some examples, the second attachment point 410b lays on a second side of the major axis 402 opposite the first side of the major axis 402, and on a second side of the minor axis 404 opposite the first side of the minor axis 404.

According to some examples, the body 102 includes an offset axis 406 that lays between the major axis 402 and the minor axis 404. The first attachment point 410a and the second attachment point 410b may lay on the offset axis 406. In some examples, the gate 108 lays on the offset axis 406 when the gate 108 is in the initial position 200.

According to some examples, the gate 108 is heat treated. A spring force 706 of the gate 108 may be increased via the gate 108 being heat treated.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having,"and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or"applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

We claim:

1. An apparatus, comprising:
   a body; and
   a gate rotatably coupled to the body, the gate including an arm, a middle portion, and a bend,
      wherein the gate is configured to rest in an initial position,
      wherein the gate is configured to move from the initial position in response to a first force,
      wherein the arm moves a greater distance than the middle portion when the gate is moved from the initial position, and
      wherein a torque occurs in the bend when the gate is moved from the initial position.

2. The apparatus of claim 1, wherein the torque creates a potential energy that returns the gate to the initial position in response to removal of the first force on the gate.

3. The apparatus of claim 1, wherein the body comprises a nose, and wherein the bend is configured to abut the nose when the gate is in the initial position.

4. The apparatus of claim 3, wherein the nose comprises a latch, and wherein the bend is configured to abut the latch when the gate is in the initial position.

5. The apparatus of claim 1, wherein the body comprises a spine, and wherein the bend is configured to abut the spine when the gate is in the initial position.

6. The apparatus of claim 5, wherein the body comprises an elbow.

7. The apparatus of claim 6, comprising a confinement area, the confinement area comprising an area between the elbow, the spine, and the gate when the gate is in the initial position.

8. The apparatus of claim 7, wherein an opening is created when the gate is moved from the initial position, and
wherein the confinement area is accessible via the opening.

9. An apparatus, comprising:
a body; and
a gate including a first arm, a second arm, a middle portion, a first bend between the first arm and the middle portion, and a second bend between the second arm and the middle portion, the gate rotatably coupled to the body,
wherein the gate is configured to rest in an initial position,
wherein the gate is configured to move from the initial position in response to a first force,
wherein the first arm and the second arm move a greater distance than the middle portion when the gate is moved from the initial position, and
wherein a first torque occurs in the first bend and a second torque occurs in the second bend when the gate is moved from the initial position.

10. The apparatus of claim 9, wherein the body comprises a nose, and
wherein a bend selected from the group consisting of the first bend and the second bend is configured to abut the nose when the gate is in the initial position.

11. The apparatus of claim 10, wherein the nose comprises a latch, and
wherein the bend selected from the group consisting of the first bend and the second bend is configured to abut the latch when the gate is in the initial position.

12. The apparatus of claim 11, wherein the body comprises a spine,
wherein the first bend is configured to abut the latch, and
wherein the second bend is configured to abut the spine when the gate is in the initial position.

13. The apparatus of claim 12, comprising a first crotch at a location where the second bend makes contact with the spine.

14. The apparatus of claim 13, comprising a first confinement area comprising an area between the first crotch, the spine, and the gate when the gate is in the initial position.

15. The apparatus of claim 13, wherein the body comprises an elbow, and
wherein the elbow comprises a second crotch.

16. The apparatus of claim 15, comprising:
a first confinement area, the first confinement area comprising an area between the first crotch, the spine, and the gate when the gate is in the initial position; and
a second confinement area comprising an area between the second crotch, the spine, and the gate when the gate is in the initial position.

17. An apparatus, comprising:
a body including a first attachment point and a second attachment point; and
a gate including a first arm, a second arm, a middle portion, a first bend between the first arm and the middle portion, and a second bend between the second arm and the middle portion,
wherein the first arm is configured to rotatably couple to the first attachment point,
wherein the second arm is configured to rotatably couple to the second attachment point,
wherein the gate is configured to rest in an initial position,
wherein the gate is configured to move from the initial position in response to a first force,
wherein the first arm and the second arm move a greater distance than the middle portion when the gate is moved from the initial position, and
wherein a first torque occurs in the first bend and a second torque occurs in the second bend when the gate is moved from the initial position.

18. The apparatus of claim 17, wherein the body comprises a major axis, and
wherein the gate is parallel to the major axis when the gate is moved from the initial position.

19. The apparatus of claim 18, wherein the body comprises a minor axis perpendicular to the major axis,
wherein the first attachment point lays on a first side of the major axis and on a first side of the minor axis, and
wherein the second attachment point lays on a second side of the major axis opposite the first side of the major axis, and on a second side of the minor axis opposite the first side of the minor axis.

20. The apparatus of claim 19, wherein the body comprises an offset axis that lays between the major axis and the minor axis, and
wherein the first attachment point and the second attachment point lay on the offset axis.

* * * * *